United States Patent [19]

Carolan

[11] Patent Number: 4,792,152
[45] Date of Patent: Dec. 20, 1988

[54] GOLF BAG CARRIER

[75] Inventor: Declan T. Carolan, Kinnegad, Ireland

[73] Assignee: Remplir Enterprises Limited, Mullingar, Ireland

[21] Appl. No.: 927,441

[22] Filed: Nov. 6, 1986

[51] Int. Cl.$^4$ .............................................. B62B 1/12
[52] U.S. Cl. ............................ 280/47.26; 280/DIG. 6
[58] Field of Search ........... 280/DIG. 6, 47.26, 47.24, 280/47.18, 47.13 R

[56] References Cited

U.S. PATENT DOCUMENTS

| | | | |
|---|---|---|---|
| 1,231,030 | 6/1917 | Kelley | 280/47.26 X |
| 2,687,895 | 8/1954 | Rutledge | 280/47.26 |
| 3,058,504 | 10/1962 | Powers | 280/DIG. 6 X |
| 3,188,109 | 6/1965 | Broadrick | 280/47.26 |
| 3,353,838 | 11/1967 | Schmid | 280/DIG. 6 |
| 4,062,564 | 12/1977 | Schimmeyer | 280/DIG. 6 X |
| 4,550,930 | 11/1985 | Proffit | 280/47.26 X |
| 4,629,202 | 12/1986 | Nelson et al. | 280/DIG. 6 |

FOREIGN PATENT DOCUMENTS 800918  9/1958  United Kingdom .

OTHER PUBLICATIONS

European Patent Application 0 160 575, Nov. 6, 1985, Carolan.

*Primary Examiner*—David M. Mitchell
*Assistant Examiner*—Tamara L. Finlay
*Attorney, Agent, or Firm*—Bernard, Rothwell & Brown

[57] ABSTRACT

A golf bag carrier fitted to a golb bag 30 includes a spine 10 secured to the bag. In the travelling mode of the carrier, the handle 12 is extended from the upper end 20 of the spine 10 and the spigot 34 of wheel frame 14 is engaged with socket 32 on the spine 10. A pair of wheels 16 is provided on the wheel frame. In the storage mode, the wheels 16 are removed from the wheel frame 14 and the second spigot 50 of the wheel frame 16 is engaged with the socket 32. The wheels 16 are placed on the spike element 52 at the lower end 22 of the spine 10 and the handle 12 is retracted into the spine 10.

15 Claims, 3 Drawing Sheets

GOLF BAG CARRIER

The present invention relates to a golf bag carrier.

A golf bag containing a full set of golf clubs is quite heavy and is provided with a shoulder strap to enable a player to carry the golf bag around a golf course. The golf bag may be placed on a golf caddie, which is a two-wheeled cart or trolley.

The main disadvantage with known golf caddies is that they are unwieldly and cumbersome and present problems when being stored in club houses or when being transported in motor cars.

The object of this invention is to provide a golf bag carrier which alleviates the above disadvantages.

Various attempts have been made to provide a golf caddie or golf bag carrier which does not have these disadvantages. Two of such golf bag carriers are disclosed in British Patent Specification Nos. 607,387 (Chilton) and 648,714 (Hutsell).

British Patent Specification No. 607,387 discloses a bag for golf clubs, having a pair of lugs and a spring steel clip mounted underneath the base of the bag, whereby a pair of wheels can be detachably mounted at or near the front bottom edge of the bag. A telescopic handle is provided on the bag for use in pulling the bag on the wheels. When not in use the wheels may be detached from the bag and stored under the bag in a position which is parallel to the base of the bag. A spring loaded frame is used to support the wheels when they are stored in this manner.

The golf bag carrier disclosed in the Chilton specification, while overcoming some of the disadvantages mentioned, is unstable in that when standing the bag is in a vertical position and thus could be toppled, for example in a strong wind. Also it has the disadvantage in that a specially designed golf bag is required for use with the carrier.

British Patent Specification No. 648,714 discloses a cart for a golf bag, the cart comprising a frame for supporting the bag, outriggers pivotally coupled to a collapsible bracket carried by the frame and a pair of wheels detachably mounted on the outriggers. The cart also has a storage mode in which the frame is collapsed by being telescoped, the outriggers and the collapsible bracket are folded in towards the frame and the wheels are stored underneath the base of the cart.

The golf cart disclosed in the Hutsell specification while also having a number of advantages is of a relatively large construction and consists of a large number of moving parts which have to be folded on top of one another in the correct order when the cart is being placed in its storage mode.

The present invention provides a golf bag carrier characterised in that it comprises a spine member; attachment means at the upper and lower ends of the spine for attaching the spine to a golf bag; a wheel frame to which a pair of wheels may be removably attached, and securing means by which the wheel frame is removably engageable with the spine to allow the carrier to be assembled in either a travelling mode or storage mode. Preferably, the wheel frame is an A-frame and the securing means comprises two spigots each of which is removably engageable with a socket to allow the carrier to be assembled in either a stable travelling mode or a compact storage mode.

In order to provide a means for anchoring the golf-bag carrier in the ground, a spike element may be provided at the lower end of the spine with the spike element being removably attached to the spine.

Conveniently, the spike element is substantially L-shaped so as to provide a foot rest for use in forcing the spike into the ground.

Advantageously, the spike element is provided with retaining means which allow the pair of wheels to be removably attached to the spike for storage purposes.

Preferably, a telescopic handle is provided at the upper end of the spine for use in propelling the carrier.

The handle may be provided with a crooked end and is adapted to be used in a pulling or pushing mode.

The invention will now be more particularly described with reference to the accompanying drawings, which show by way of example only, a preferred embodiment according to the invention. In the drawings.

Figure 1:
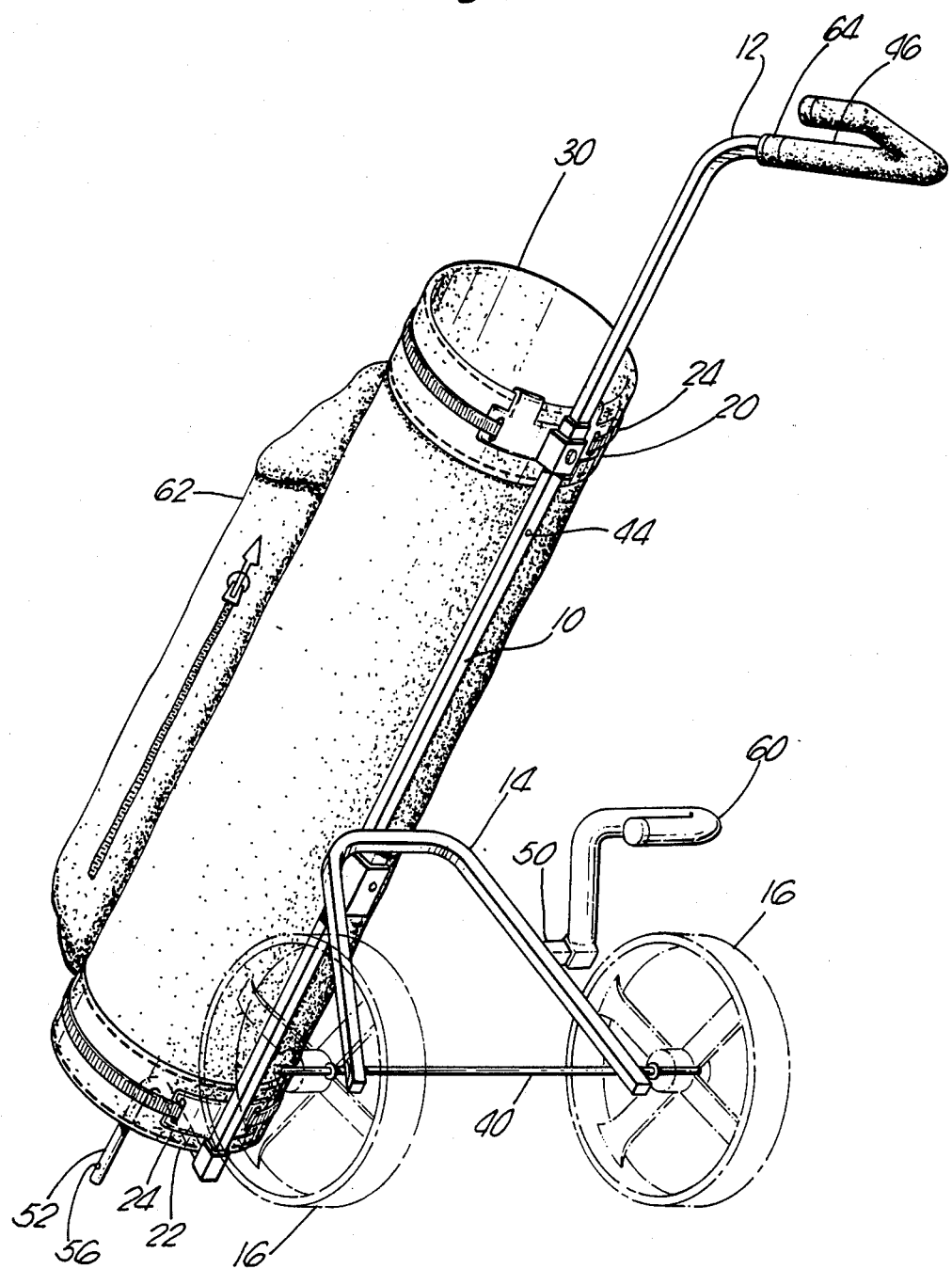
FIG. 1 is a perspective view of a golf bag carrier according to the invention in a travelling mode with a golf bag mounted thereon.

Referring to the drawings, the golf bag carrier comprises a spine 10, a handle 12 and a wheel frame 14 to which a pair of wheels 16 are removably attached by means of spring detents 18. At the upper end 20 and lower end 22 of the spine 10 are attachment means 24 for attaching the spine to a golf bag 30. The attachment means 24 at the upper end 20 comprises a clip 26 and a strap 27 and the attachment means 24 at the lower end 22 comprises a band 28 and a strap 29. The spine 10 may be attached to the bag 30 by a number of other means (not shown) including rivetting the clip 26 and the band 28 to a suitably strengthened bag.

The spine 10 is provided with a socket 32 into which spigot 34 of wheel frame 14 is removably engaged. The socket 32 has a hole 36 into which spring loaded pin 38 of the spigot locates. Wheel frame 14 is substantially A-shaped with axle 40 forming the transverse member of the frame and with spigot 34 on the apex of the A-frame. When spigot 34 of wheel frame 14 is engaged with socket 32, the carrier is in a stable travelling mode with a frame 14 and its wheel-supporting legs extending generally perpendicular to the spine 10.

Figure 2:
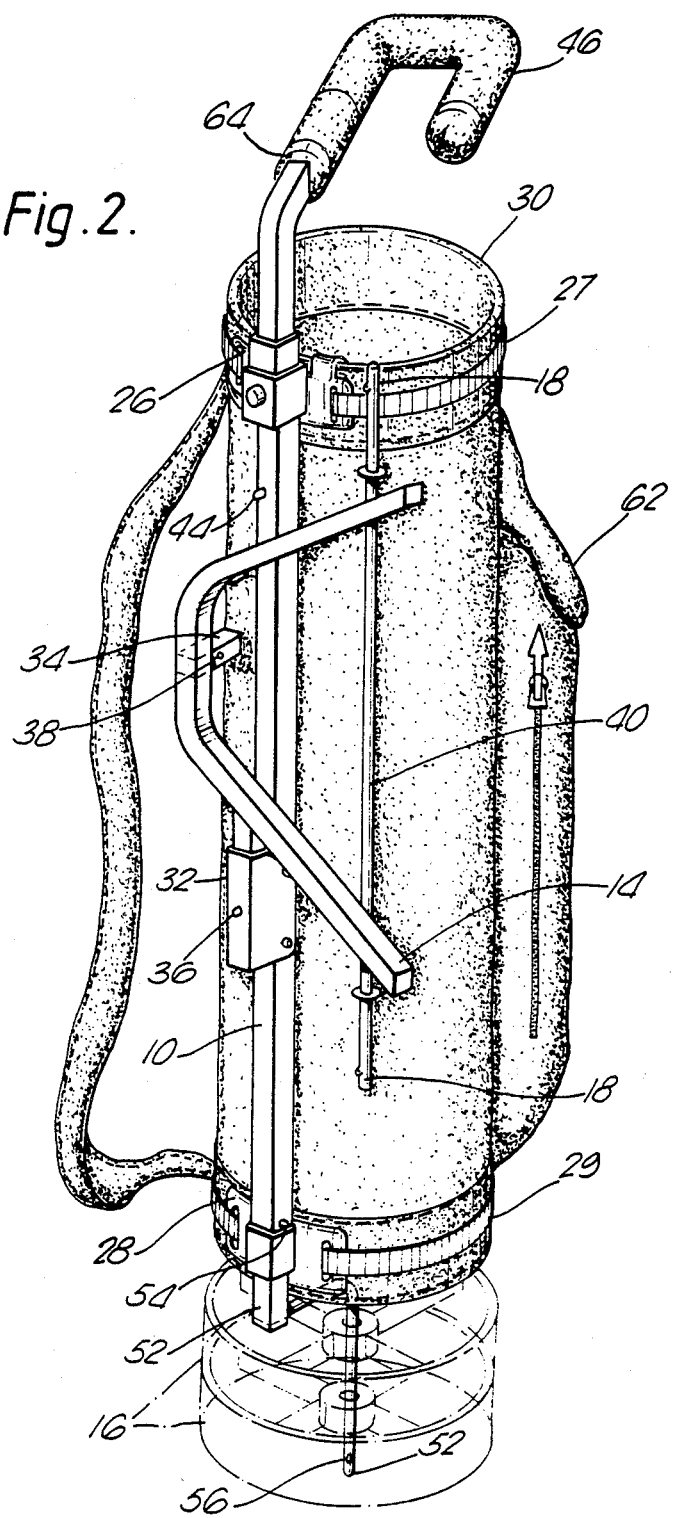
FIG. 2 is a perspective view of the golf bag carrier in a storage mode.

The handle 12 may be retracted into and extended from the spine 10 and is fixed in position by means of a spring loaded pin 44 engaging a hole in the spine 10. The end of the handle 12 is provided with a crook 46, which may be used either when pushing or pulling the carrier. When the carrier is being pushed, the crook 46 extends from the bag as shown in FIG. 1 and when the carrier is being pulled, the crook 46 extends over the bag as shown in FIG. 2. When used in the latter position the crook 46 may rest on a person's arm. To alter the crook 46 from one position to another, the handle 12 is removed completely from the spine 10, rotated 180° about its longitudinal axis and inserted into the spine 10.

To place the carrier into the storage mode as shown in FIG. 2, the handle 12 is retracted into the spine 10 and the spigot 34 of the wheel frame 14 is disengaged from the socket 32. The wheels 16 are removed from the wheel frame 14 by placing the wheel frame on its side, i.e. with one of the wheels 16 lying on its side, resting one's foot on the wheel and withdrawing the axle 40 from the wheel. The second wheel 16 is removed in a similar manner. With the wheels 16 removed, a second spigot 50 of the wheel frame 14 is engaged with the socket 32, to place the wheel frame in the storage mode. The second spigot 50 extends from one leg of the A-frame 14 so that the frame is juxtaposed to the spine 10 with the frame extending generally along the length of the spine and bag with the legs of the frame being generally tangential to the bag. The wheels 16 are stored by placing them onto an inverted L-shaped spike element 52 removably engaged at end 22 of the spine 10 by means of a spring loaded pin 54 engaging a hole in the spine. A spring loaded detent 56 is provided on the spike element 52 for retaining the wheels 16 on the spike element.

Figure 3:
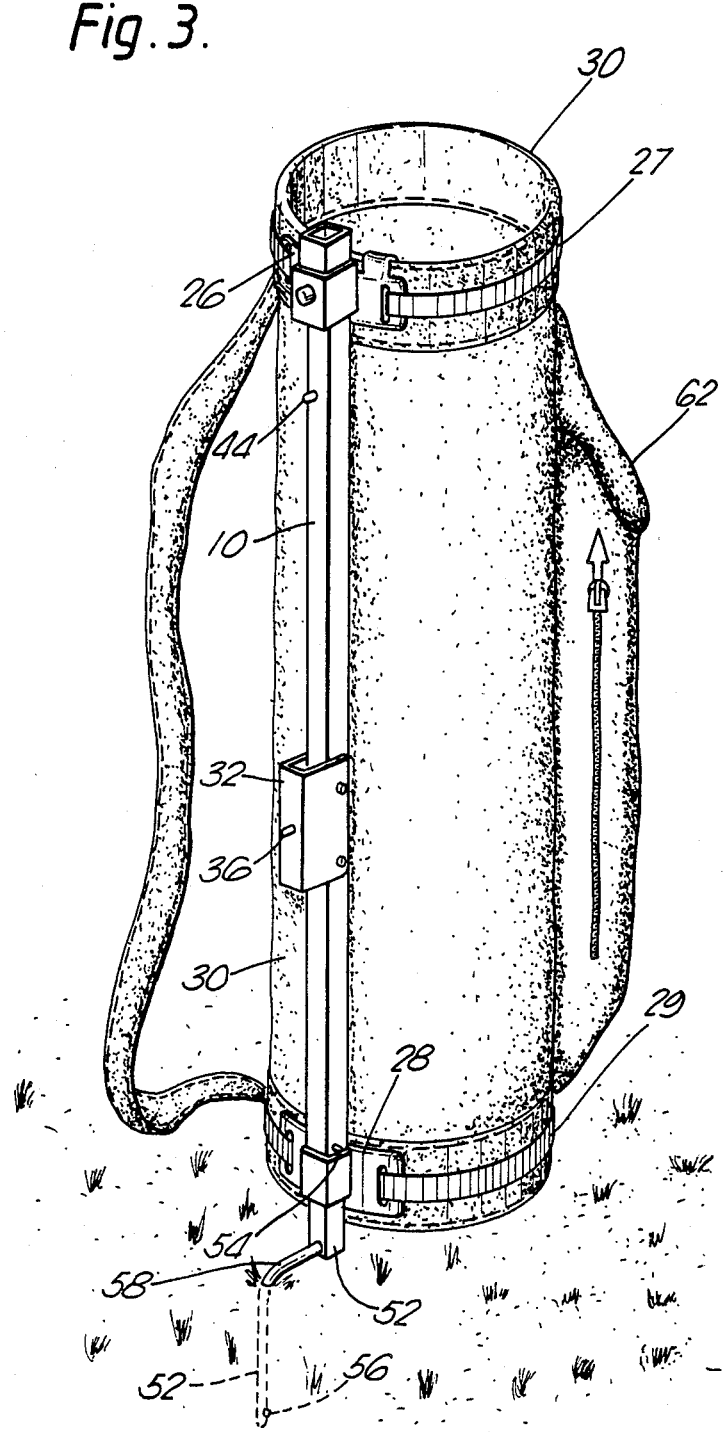
FIG. 3 is a perspective view of the golf bag carrier supporting the golf bag in an upright position.

The spike element 52 can also be used to anchor the golf bag carrier in the ground as shown in FIG. 3. When used for this function, the horizontal member 58 of the spike element 52 can be used as a foot-rest for use in forcing the spike element into the ground.

When required, a seat 60 may be placed on the second spigot 50 as shown in FIG. 1. When not in use, the seat 60 may be stored in a pocket 62 of the golf bag 30.

A cushioned collar 64 is provided on the handle 12 which, when the golf bag 30 contains golf clubs (not shown) may be positioned so as to prevent the heads of the clubs from hitting the handle.

The metal parts of the golf bag carrier are finished to a high standard e.g. chromium plating so as to give an aesthetic appearance to the carrier.

The golf bag carrier may be sold separately for attachment to a golf bag or may be sold with a golf bag attached.

I claim:

1. A golf bag carrier which is convertible between an operational mode and a storage mode, comprising:
   a spine;
   a telescopic handle engageable with the spine;
   attachment means at the upper and lower ends of the spine for attaching the spine to a golf bag;
   a wheel frame to which a pair of wheels may be removably attached; and
   quick release wheel frame securing means, including two securing spigots on the wheel frame and a socket on the spine, for detachably securing the wheel frame to the spine in first and second configurations wherein a first spigot of the two spigots on the wheel frame is removably engageable with the socket on the spine in the first configuration with the wheel frame extended for operation, and the second spigot on the wheel frame is removably engageable with the socket on the spine in the second configuration with the wheel frame juxtaposed to the spine for storage.

2. A golf bag carrier as claimed in claim 1 wherein the wheel frame is an A-frame.

3. A golf bag carrier as claimed in claim 2 wherein one of the spigots includes spring-loaded pin means and the socket includes a hole for receiving spring-loaded pin means to provide for quick attachment and release of the A-frame to the spine.

4. A golf bag carrier as claimed in claim 2 wherein the first spigot extends from the apex of the A-frame for engaging the socket in the first configuration or operational mode, and the second spigot extends from one leg of the A-frame for engaging the socket in the second configuration or storage mode.

5. A golf bag carrier as claimed in claim 1 in which a spike element is removably attached to the lower end of the spine, so as to provide means for anchoring the golf bag carrier in the ground.

6. A golf bag carrier as claimed in claim 5 in which the spike element is substantially L-shaped so as to provide a foot rest for use in forcing the spike into the ground.

7. A golf bag carrier as claimed in claim 1 in which a telescopic handle is provided at the upper end of the spine for use in propelling the carrier.

8. A golf bag carrier as claimed in claim 7 in which the handle is provided with a crooked end and is adapted to be use in a pulling or pushing mode.

9. A golf bag carrier as claimed in claim 7 in which a cushioned collar is provided on the handle so as to protect heads of clubs in the golf bag.

10. A golf bag carrier as claimed in claim 1 which additionally includes a seat.

11. A golf bag carrier as claimed in claim 1 including a golf bag mounted thereon.

12. A golf bag carrier which is convertible between an operational mode and a storage mode, comprising:
    a spine;
    a telescopic handle engageable with the spine;
    attachment means at the upper and lower ends of the spine for attaching the spine to a golf bag;
    a wheel frame to which a pair of wheels may be removably attached;
    quick release wheel frame securing means for detachably securing the wheel frame to the spine in first and second configurations wherein the wheel frame is removably engageable with the spine in the first configuration with the wheel frame extended for operation, and the wheel frame is removably engageable with the spine in the second configuration with the wheel frame juxtaposed to the spine for storage; and
    a spike element removably attachable to the lower end of the spine, so as to provide means for anchoring the golf bag carrier in the ground;
    said spike element being provided with retaining means for retaining the pair of wheels, which are removed from the wheel frame, on the spike.

13. A golf bag carrier which is convertible between an operational mode and a storage and transportation mode, comprising:
    a spine;
    a telescopic handle engageable with the spine;
    golf bag securing means on the spine by means of which a golf bag may be secured to the spine;
    a wheel frame;
    a pair of wheels;
    wheel securing means of the quick release type for detachably securing the wheels of the wheel frame; and
    wheel frame securing means of the quick release type for detachably securing the wheel frame to the spine;
    said wheel frame securing means including means mounted on the spine and the wheel frame for securing the wheel frame to the spine in two different dispositions, firstly extending generally perpendicular thereto and secondly, generally along the length of the spine and the bag with legs of the frame extending generally tangentially to the bag, whereby the carrier may be converted from the operational mode to the storage and transportation mode be detaching the wheels from the wheel frame, and the wheel frame from the spine, and securing the wheel frame along the length of the spine.

14. A golf bag carrier which is convertible between an operational mode and a storage/transportation mode, comprising:
 a spine;
 a telescopic handle engageable with the spine;
 attachment means at the upper and lower ends of the spine for attaching the spine to a golf bag;
 a wheel frame to which a pair of wheels may be removably attached;
 securing means including a pair of spigot elements provided on the frame and a single socket elements provided on the spine for receiving the spigot elements in the respective operational and storage/transportation modes;
 each spigot element and socket element having self-locking means for being self locking when mutually engaged, and single action release means for releasing the self-locking means so that each spigot element may be withdrawn from the socket element; and
 said spigot and socket elements being such that the wheel frame is removably engageable with the spine in a first configuration with the wheels extended for the operational mode and the wheel frame is engageable with the spine in a second configuration with the wheel frame juxtaposed to the spine for the storage/transportation mode.

15. A golf bag carrier which is convertible between an operational mode and a storage/transportation mode, comprising:
 a spine;
 a telescopic handle engageable with the spine;
 attachment means at the upper and lower ends of the spine for attaching the spine to a golf bag;
 a wheel frame to which a pair of wheels may be removably attached;
 securing means including complementary engaging spigot and socket elements, each spigot element and socket element having self-locking means for being self locking when mutually engaged, and single action release means for releasing the self-locking means so that the spigot element may be withdrawn from the socket element;
 said spigot and socket elements being such that the wheel frame is removably engageable with the spine in a first configuration with the wheels extended for the operational mode and the wheel frame is engageable with the spine in a second configuration with the wheel frame juxtaposed to the spine for the storage/transportation mode; and
 said self locking means and said single action release means including spring-loaded pin means on the spigot element and an opening in the socket element for receiving the spring-loaded pin means.

* * * * *